United States Patent [19]

Fu et al.

[11] Patent Number: 5,226,127
[45] Date of Patent: Jul. 6, 1993

[54] METHOD AND APPARATUS PROVIDING FOR CONDITIONAL EXECUTION SPEED-UP IN A COMPUTER SYSTEM THROUGH SUBSTITUTION OF A NULL INSTRUCTION FOR A SYNCHRONIZATION INSTRUCTION UNDER PREDETERMINED CONDITIONS

[75] Inventors: Beatrice P. Fu, Mountain View; Benny Eitan, Sunnyvale, both of Calif.

[73] Assignee: Intel Corporation, Santa Clara, Calif.

[21] Appl. No.: 795,294

[22] Filed: Nov. 19, 1991

Related U.S. Application Data

[63] Continuation of Ser. No. 335,203, Apr. 7, 1989, abandoned.

[51] Int. Cl.$^5$ .................................................. G06F 9/30
[52] U.S. Cl. ................................. 395/375; 395/500; 395/550; 395/800; 364/DIG. 1
[58] Field of Search ... 364/200 MS File, 900 MS File; 395/375, 500, 800, 550

[56] References Cited

U.S. PATENT DOCUMENTS

| | | | |
|---|---|---|---|
| 4,095,278 | 6/1978 | Kihara | 364/900 |
| 4,398,247 | 8/1983 | Bazlen et al. | 364/200 |
| 4,439,828 | 3/1984 | Martin | 364/200 |
| 4,773,002 | 9/1988 | Zwasaki et al. | 364/200 |
| 4,791,557 | 12/1988 | Angel et al. | 395/375 |
| 4,866,712 | 9/1989 | Chao | 371/5.1 |
| 5,099,421 | 3/1992 | Buerkle et al. | 395/375 |
| 5,155,818 | 10/1992 | Stein et al. | 395/375 |

FOREIGN PATENT DOCUMENTS 0211384  7/1986  European Pat. Off. .

Primary Examiner—Robert B. Harrell
Assistant Examiner—William M. Treat
Attorney, Agent, or Firm—Blakely, Sokoloff, Taylor & Zafman

[57] ABSTRACT

A method for conditional speed-up of execution of an instruction sequence having synchronization instructions. The method has particular application in a computer system in which compatability with instruction sequences written for the Intel 80386 or earlier processors is desirable. The method discloses replacement of certain WAIT state instruction in an instruction sequence with a null instruction in cases where the WAIT state instruction is followed by a floating point instruction including as an integral part of the instruction a WAIT state.

4 Claims, 3 Drawing Sheets

METHOD AND APPARATUS PROVIDING FOR CONDITIONAL EXECUTION SPEED-UP IN A COMPUTER SYSTEM THROUGH SUBSTITUTION OF A NULL INSTRUCTION FOR A SYNCHRONIZATION INSTRUCTION UNDER PREDETERMINED CONDITIONS

This is a continuation of application Ser. No. 07/335,203, filed Apr. 7, 1989, now abandoned.

BACKGROUND OF THE INVENTION

1. Field of the Invention

The present invention relates to the field of synchronization control in computer systems.

2. Description of Related Art

The closest art known to the Applicant is embodied in the Intel 80386$^{tm}$ ('386$^{tm}$) microprocessor manufactured by Intel Corporation of Santa Clara, Calif.

In general, computer systems utilizing the '386 microprocessor embody a number of components, such as the '386 microprocessor, a math coprocessor (typically either the 80287 or 80387 numeric coprocessor), etc. In computer systems utilizing the '386 processor, the general purpose microprocessor (i.e., the '386) and the math coprocessor are separate, discrete components.

The architecture of the '386, as in many general purpose processors, includes synchronization instructions; such synchronization instruction allow for synchronization of processing between components in a computer system utilizing the '386. Further, synchronization instruction may provide means for initiating error checking.

For example, the WAIT instruction in the '386 instruction set causes the '386 to wait execution until a numeric coprocessor (such as the 80287 or 80387) has finished a task. In general, the numeric coprocessor activates a BUSY pin. When the BUSY pin is active (brought low in the '386), the WAIT instruction suspends execution of '386 instructions until the BUSY pin is inactivated (brought high). In this way, processing on the '386 microprocessor may be suspended to guarantee that a numeric instruction being processed by the numeric coprocessor has completed execution.

It is desired to develop a method for removing (or ignoring during execution) synchronization instructions from an instruction sequence in computer systems.

Specifically, it is desired to develop a system for speeding up the execution of an instruction sequence by removing, under certain conditions, wait states created by synchronization instructions.

SUMMARY OF THE INVENTION

A method for speeding up the execution of an instruction sequence in a computer system implementing functions of a general purpose processing unit and a special purpose processing unit under common control is described. The method eliminates certain created by synchronization instructions.

The method involves the steps of detecting that a synchronization instruction has been encountered during the execution of an instruction sequence and replacing or substituting for the synchronization instruction a null instruction. In the preferred embodiment, a one clock cycle no-operation instruction is utilized as the null instruction.

The microprocessor of the preferred embodiment comprises an instruction prefetch unit for fetching instructions prior to the execution of a previous instruction. Such prefetch units are utilized in computer systems to increase the operating speed of a computer system by ensuring a queue of instructions is available for an instruction decode and instruction execution unit.

In the present invention, after encountering a synchronization instruction, but before execution of the synchronization instruction, the next instruction ("second instruction") is fetched by the prefetch unit. If the instruction is one of a predetermined set of instructions, the synchronization instruction is not executed and a null instruction is executed in its place. If the instruction is not one of the predetermined set of instructions, the synchronization instruction is executed. (In the preferred embodiment, the second instruction may not be prefetched in certain circumstances for a variety of reasons. If the second instruction is not prefetched, the synchronization instruction is executed in the normal execution sequence.)

In the preferred embodiment, many floating point instructions inherently provide for routine synchronization. The predetermined set of instructions comprises the set of such floating point instructions of the instruction set of the microprocessor of the preferred embodiment which inherently provide for routine synchronization; floating point instructions which do not inherently provide for such synchronization are not included in the predetermined set. Further, non-floating point instructions are not included in the predetermined set.

DESCRIPTION OF THE PREFERRED EMBODIMENT

A method for processing instructions in a computer system is described. In the following description, numerous specific details are set forth such as specific instructions, etc., in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

OVERVIEW OF THE PRESENT INVENTION

The preferred embodiment of the present invention is proposed for use in the next generation of microprocessor in the Intel 8086 family, commonly referred to as the 80486$^{tm}$ microprocessor ('486$^{tm}$), manufactured by Intel Corporation of Santa Clara, Calif.

The proposed '486 microprocessor implements the functions of a general purpose microprocessor (such as the functions of the Intel 80386 microprocessor) and the functions of a numeric coprocessor (such as the Intel 80387 numeric coprocessor) in a single component or "chip".

It is desired to ensure that the '486 microprocessor is capable of supporting instruction sequences written for execution on the 80386, including instruction sequences which utilize a numeric coprocessor such as the 80387.

Such instruction sequences often include synchronization instructions for synchronizing execution of the 80386 and the 80387.

DESCRIPTION OF 80386 SYNCHRONIZATION

Figure 1:
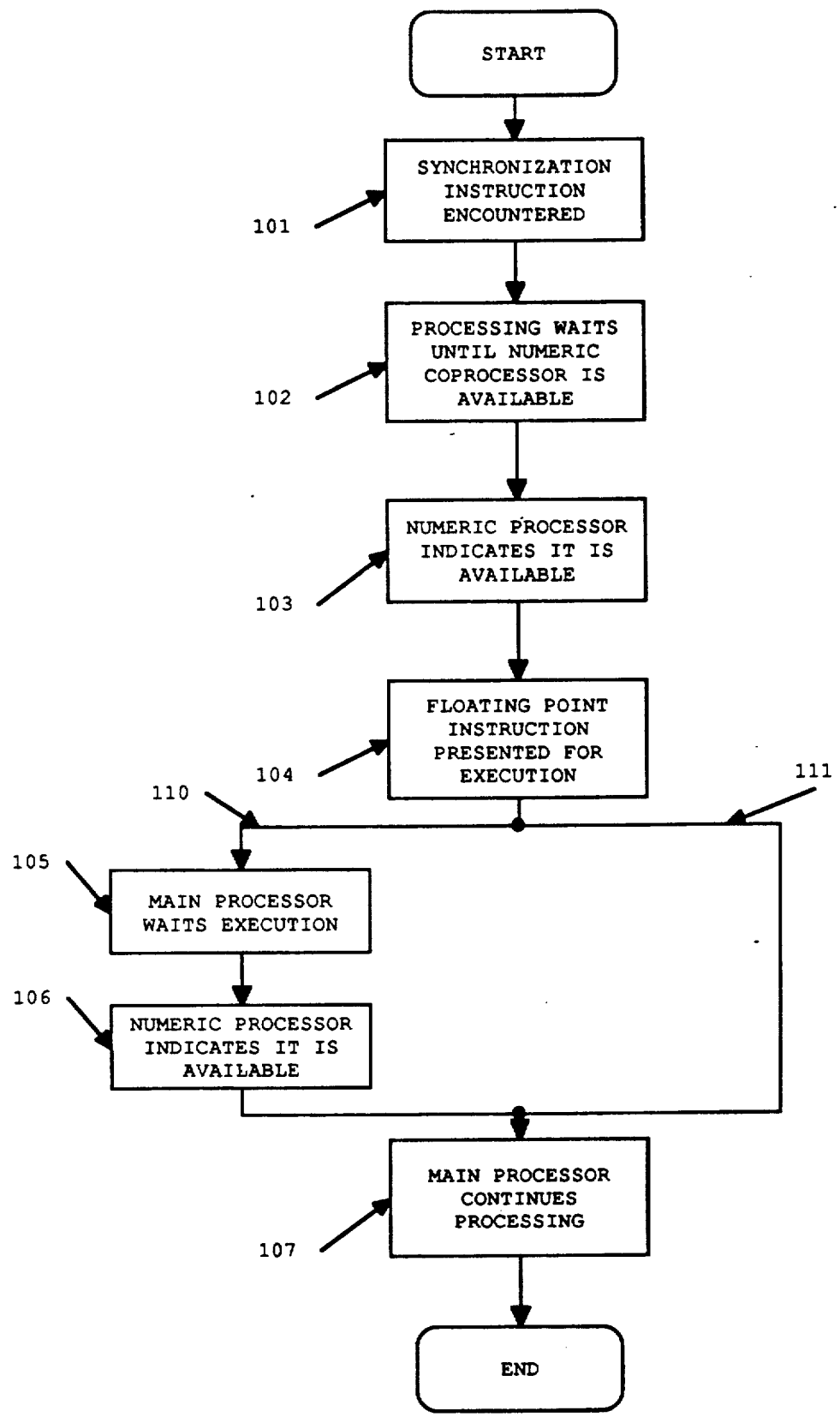
FIG. 1 is a flow diagram illustrating a known method of implementing synchronizing control flow instructions.

FIG. 1 is a flow diagram illustrating use of such synchronization instructions in an instruction sequence. A typical instruction sequence may include a synchronization instruction which causes the main processor (e.g., the '386) to wait further processing until the numeric coprocessor is available to execute another instruction, block 101 and block 102.

Typically, the synchronization instruction is a WAIT instruction. The synchronization instruction is placed in the instruction sequence to ensure the numeric coprocessor has completed execution of any prior floating point instruction before presenting the next floating point instruction for execution. (As discussed in the Background of the Invention section, the 80387 asserts a BUSY signal while processing an instruction. After completing processing of the instruction, the 80387 deasserts the BUSY pin. The 80386 will suspend execution during the time the BUSY pin is asserted if a WAIT instruction is executed.)

It is worth noting that in many 80386/80387 implementations, programmers do not have to code WAIT instructions in instruction sequences. Many assemblers for the 80386 will automatically encode the WAIT instructions in the instruction sequence.

After the numeric coprocessor indicates it is available for processing of the next instruction (by deasserting the BUSY pin), block 103, the next instruction in the instruction sequence is presented for execution, block 104. (Generally, the next instruction is a floating point instruction; however, in certain cases, it may be a non-floating point instruction.)

Certain instructions in the '386 instruction set include a WAIT state as an integral part of the instruction. In such cases, branch 110, the main processor waits execution of the next instruction in the instruction sequence until the numeric processor signals it has completed processing, block 105 and block 106. Typically, floating point instructions include a WAIT state as an integral part of the instruction where the instruction will affect memory or registers which may also be effected by instructions executing on the general purpose microprocessor.

In other cases, the floating point instruction do not include a WAIT state as an integral part of the instruction. In such cases, the main processor does not wait for the numeric coprocessor to complete processing of the instruction, branch 111. As examples, this second type of instructions include the instructions listed in TABLE I, below:

TABLE I

| Opcode | Function |
| --- | --- |
| (1) FSTENV | (Store the coprocessor's environment); |
| (2) FSTCW | (Store the coprocessor's control word); |
| (3) FSAVE | (Save the coprocessor's state); |
| (4) FSTSW | (Store the coprocessor's status word); |
| (5) FCLEX | (Clear the coprocessor's exception flags); |
| (6) FINIT | (Initialize the coprocessor); and |
| (7) FSETPM | (Place the coprocessor in protected mode). |
| (8) FENI | (Enable interrupt) |
| (9) FDIS | (Disable interrupt) |

(Note that the codes listed in Table I are operation codes ("opcodes") in the '386 instruction set, not mnemonics.)

In the case of either type of instruction, the main processor will begin execution of the next instruction in the instruction sequence at some point in time, block 107.

Further information on the 80386/80387 processors may be found with reference to Chris H. Pappas & William H. Murray, III, 80386 *Microprocessor Handbook*, Osborne McGraw-Hill, 1988.

GENERAL 80486 ARCHITECTURE OVERVIEW

The proposed 80486 microprocessor comprises a general purpose microprocessor and a numeric coprocessor integrated on a single chip. The proposed '486 microprocessor further comprises instruction prefetch circuitry and instruction decode circuitry.

PREFETCH CIRCUITRY

Figure 2:
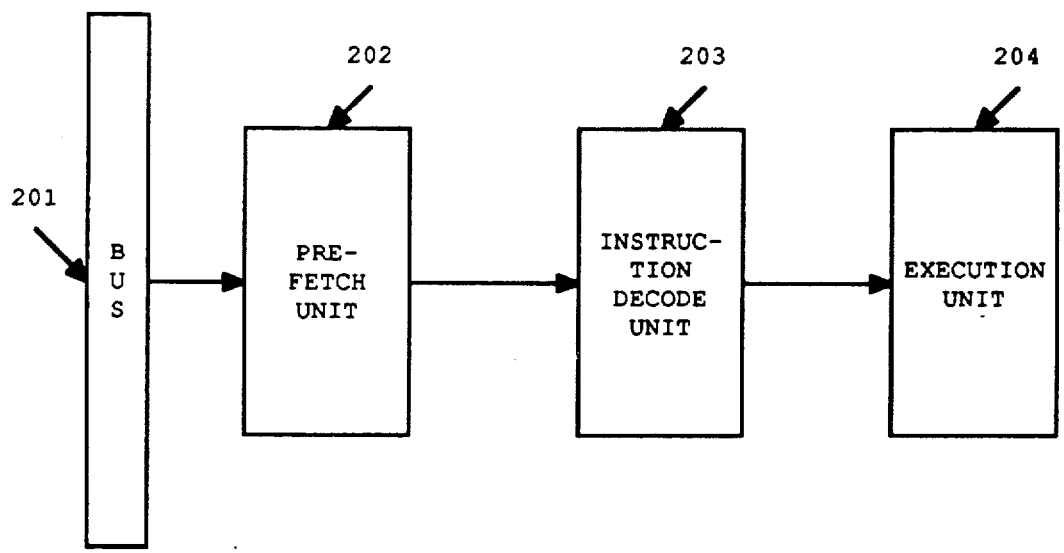
FIG. 2 is a block diagram of portions of a computer system of the present invention.

The prefetch circuitry is described with reference to FIG. 2. A prefetch unit 202 is coupled with a bus 201. This allows the prefetch unit to fetch instructions for processing. The prefetch unit 202 is further coupled with an instruction decode unit 203. The instruction decode unit 203 is provided with instructions for decoding by the prefetch unit 202. Finally, the instruction decode unit 203 is coupled with an execution unit 204 for providing microcoded instructions for execution.

The prefetch unit 202 requests an instruction and stores the instruction in a prefetch queue until the instruction decode 203 is available to process the instruction and translate the instruction into microcode. An instruction queue in the instruction decode unit 203 holds the microcoded instructions until they are executed by an execution unit 204.

Requirement for Synchronization Instructions in the Preferred Embodiment

As discussed above, in the prior art it is known to include synchronization instructions in instruction sequences to ensure proper execution. The present invention teaches that in certain cases, synchronization instructions are not necessary for ensuring the proper execution of the instruction sequence.

Specifically, the present invention teaches that synchronization instructions may not be required depending on the instruction immediately following a synchronization instruction. If the instruction immediately following the synchronization instruction includes a WAIT state as an integral part of the instruction, it has been observed that coding of a WAIT instruction previous to such an instruction is not necessary.

As one objective the present invention, a computer system is to be developed which ensures compatability with instruction sequences written for systems such as the '386. As a second objective, it is desired to increase the performance of the computer system of the present invention by effectively removing certain synchronization instructions from such instruction sequences.

It is worth noting that, in the system of the preferred embodiment, a WAIT instruction requires a minimum of 3 clock cycles to complete. As will be detailed below, the system of the present invention effectively removes from execution certain WAIT instructions and replaces the WAIT instruction with a null operation. In the preferred embodiment, the null operation requires 1 clock cycle for execution.

METHOD OF THE PREFERRED EMBODIMENT

Figure 3:
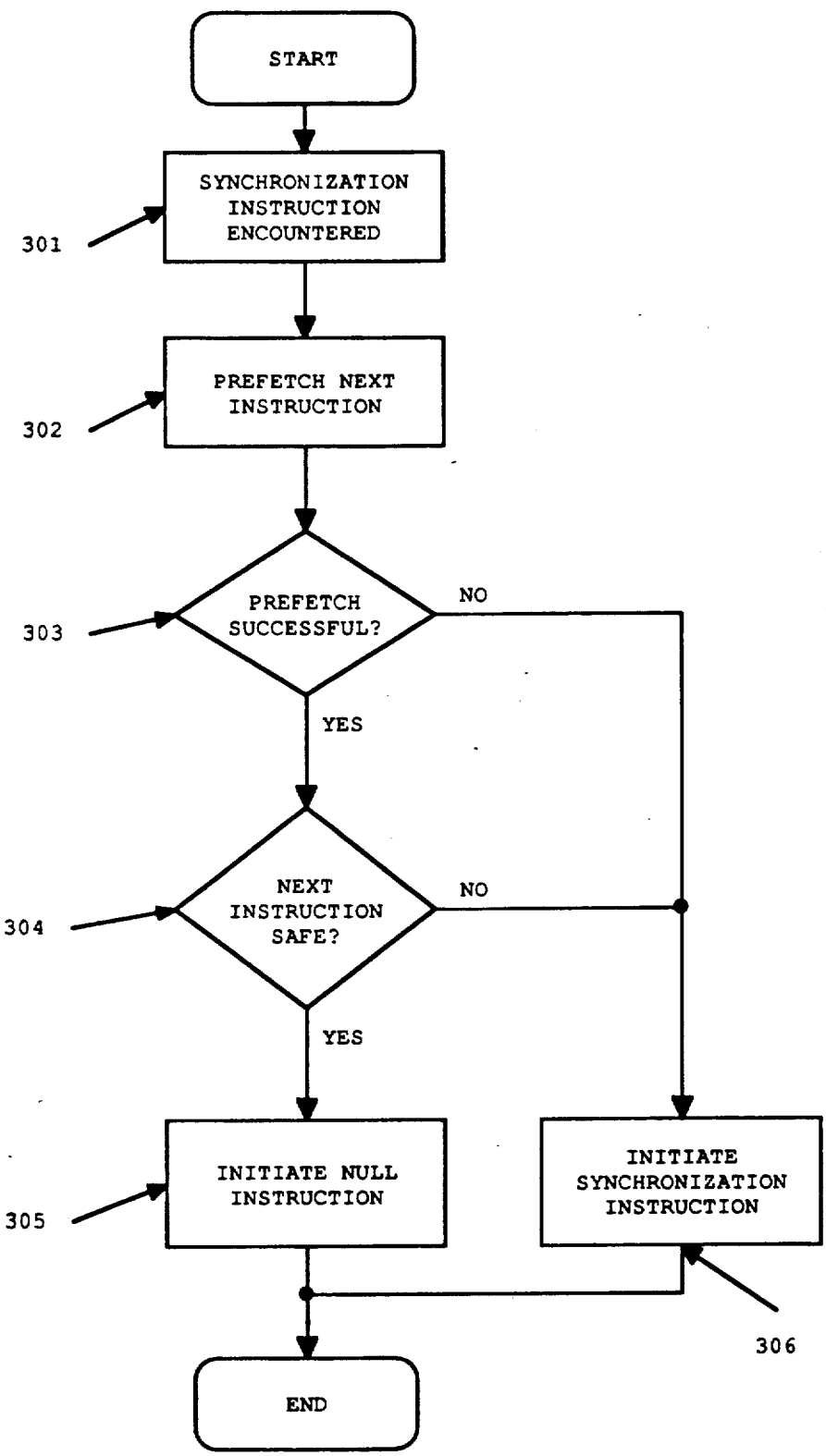
FIG. 3 is a flow diagram illustrating a method of the present invention.

A method utilized by the preferred embodiment to improve execution time of an instruction sequence by removing selected synchronization instructions is described with reference to the flow diagram of FIG. 3.

In an instruction sequence, a synchronization instruction may be encountered, block 301. As stated previously, instruction sequences commonly utilize the WAIT instruction of the instruction set for the 8086 family of microprocessors as a synchronization instruction.

As described previously, the WAIT instruction is used to cause the general purpose processor portion of the computer system to wait, or suspend, execution of instructions until the numeric processor portion of the computer system has finished a task.

The system of the present invention comprises means for allowing the next instruction in the instruction sequence to be fetched and examined prior to executing the next instruction in the instruction sequence, block 202. In the preferred embodiment, the prefetch unit waits until the bus is available and fetches the next instruction and stores it in a prefetch queue. In certain cases, such as when the bus is servicing higher priority requests, prefetching does not occur.

Assuming the prefetch was successful, block 103, the present invention teaches determining whether the instruction fetched is one of a set of instructions for which the previous synchronization is not necessary. It has been determined that synchronization instructions are not necessary in instruction sequences before certain so-called "safe" instructions.

In the preferred embodiment, these "safe" instructions include instructions to be executed by the numeric processor which include a WAIT state as an integral part of the instruction. (In general, in the instruction set of the processor of the preferred embodiment, these instruction are the floating point instructions, such as F2XM1, FABS, FADD/FADDP, FBLD, FBSTP, etc.).

The predetermined set of "safe" instructions in the preferred embodiment does not include certain floating point instructions which do not have synchronization built into the instruction. Examples of these instructions are listed with reference to TABLE I, above. Further, the predetermined set of safe instructions of the preferred embodiment does not include any instructions to be executed by the general purpose processor (e.g., non-floating point instructions such as LOOP, LSL, MOV, MUL, etc.).

By way of example, the instruction sequence detailed in TABLE II may have been written for execution on a computer system utilizing an 80386:

TABLE II

| Instruction # | Instruction |
|---|---|
| (1) | WAIT |
| (2) | FINIT |
| (3) | WAIT |
| (4) | FILD Word Ptr (0006) |
| (5) | WAIT |
| (6) | FLDPI |
| (7) | WAIT |
| (8) | FDIV ST.ST(1) |

Synchronization instructions numbered 3, 5 and 7 in TABLE II are not necessary for proper execution of the instruction sequence on a computer system embodying the '486 processor. Therefore, the method of the present invention replaces the synchronization instructions (WAIT instructions) with a null instruction, block 305. The null instruction requires one clock cycle for execution as opposed to a minimum of three clock cycles for the WAIT instruction.

Synchronization instruction numbered 1 in TABLE II is required by the computer system of the present invention and, therefore, is not replaced by a null instruction. This synchronization instruction is required because the FINIT instruction does not include a WAIT state as an integral part of the instruction.

In general, in the system of the present invention, synchronization instructions preceding floating point instructions which provide routine synchronization are replaced with a null instruction. The null instruction does not perform any operation; rather it only affects the (E)IP register (instruction pointer register).

In other cases, such as synchronization instructions preceding non-floating point instructions and synchronization instruction preceding floating point instructions not providing routine synchronization, the synchronization instruction are executed in the normal course of the instruction sequence, block 306.

Thus, a method for avoiding time penalties associated with synchronization instructions is described. Although the present invention has been described with specific reference to a number of details of the preferred embodiment, it will be obvious that a number of modifications and variations may be employed without departure from the scope and spirit of the present invention. Accordingly, all such variations and modifications are included within the intended scope of the invention as defined by the following claims.

We claim:

1. A circuit for executing a sequence of computer instructions comprising:
   (a) a special purpose processor for executing at least a first subset of said computer instructions;
   (b) a general purpose processor coupled with said special purpose processor for executing at least a second subset of said set of computer instructions, said second subset including at least a synchronization instruction for causing said general purpose processor to wait further processing until said special purpose processor signals completion of processing
   (c) an instruction prefetch unit for prefetching instructions for execution by said general purpose processor and said special purpose processor, said instruction prefetch unit capable of fetching at least said synchronization instruction and a second instruction from said sequence of instructions;
   (d) an instruction decode unit for decoding fetched instructions, said instruction decode unit coupled with said instruction prefetch unit, said general purpose processor, and said special purpose processor; and
   (e) determining means coupled to receive prefetched instructions and to determine if said second instruction is one of a predetermined set of instructions and, if said second instruction is one of a predetermined set of instructions, causing action to be taken by said general purpose processor to replace said synchronization instruction with a null operation instruction.

2. The circuit as recited by claim 1 wherein said prefetch means is coupled to a bus to allow prefetching of said synchronization instruction over said bus.

3. The circuit as recited by claim 1 wherein said general purpose processor and said special purpose processor are integrated onto a single component.

4. The circuit as recited by claim 1 wherein said predetermined set of instructions comprises floating point instructions with routine synchronization.

* * * * *